(12) United States Patent
Dumont

(10) Patent No.: US 12,459,669 B2
(45) Date of Patent: Nov. 4, 2025

(54) CART FOR ASSEMBLING AND TRANSPORTING AN AIRCRAFT ENGINE TO A TEST CELL

(71) Applicant: SAFRAN AERO BOOSTERS SA, Herstal (BE)

(72) Inventor: Franck Dumont, Moissy-Cramayel (FR)

(73) Assignee: SAFRAN AERO BOOSTERS, Herstal (BE)

( * ) Notice: Subject to any disclaimer, the term of this patent is extended or adjusted under 35 U.S.C. 154(b) by 256 days.

(21) Appl. No.: 18/022,226

(22) PCT Filed: Aug. 19, 2020

(86) PCT No.: PCT/US2020/046907
§ 371 (c)(1),
(2) Date: Feb. 20, 2023

(87) PCT Pub. No.: WO2022/039731
PCT Pub. Date: Feb. 24, 2022

(65) Prior Publication Data
US 2023/0322411 A1 Oct. 12, 2023

(51) Int. Cl.
*B64F 5/50* (2017.01)
*B62B 3/00* (2006.01)
(Continued)

(52) U.S. Cl.
CPC ............... *B64F 5/50* (2017.01); *B62B 3/001* (2013.01); *B62B 3/02* (2013.01); *B62B 3/10* (2013.01);
(Continued)

(58) Field of Classification Search
CPC ......... B64F 5/50; G01M 15/14; G01M 15/02; F05D 2260/12; F05D 2260/02;
(Continued)

(56) References Cited

U.S. PATENT DOCUMENTS 5,575,607 A * 11/1996 Grout ..................... B66C 19/02
414/460
6,170,141 B1 1/2001 Rossway et al.
(Continued)

FOREIGN PATENT DOCUMENTS

DE 102015214669 A1 * 2/2017 ............... B64F 5/50
EP 0868372 B1 10/1998
(Continued)

OTHER PUBLICATIONS

International Search Report dated May 26, 2021 for Parent PCT Application No. PCT/US2020/046907.

*Primary Examiner* — Peter J Macchiarolo
*Assistant Examiner* — Timothy P Graves
(74) *Attorney, Agent, or Firm* — James E. Walton

(57) ABSTRACT

Disclosed is a cart (2) for transporting an aircraft engine, comprising a base frame (4) equipped with wheels (6) for riding on a floor; at least two engine arms (14, 16) extending horizontally and movable vertically relative to the base frame, structured and designed for supporting the aircraft engine; and at least two adapter arms (20) extending horizontally at a higher level than the at least two engine arms, structured and designed for supporting an adapter coupled at the top of the aircraft engine. Disclosed is also a method of transporting an aircraft engine to a test cell.

20 Claims, 4 Drawing Sheets

(51) Int. Cl.
     *B62B 3/02*          (2006.01)
     *B62B 3/10*          (2006.01)
     *B62B 5/00*          (2006.01)
     *F01D 25/28*        (2006.01)
     *G01M 15/02*        (2006.01)
     *G01M 15/14*        (2006.01)

(52) U.S. Cl.
     CPC .......... *B62B 5/0026* (2013.01); *F01D 25/285* (2013.01); *G01M 15/02* (2013.01); *G01M 15/14* (2013.01); *B62B 2202/60* (2013.01); *B62B 2206/003* (2013.01); *F05D 2260/02* (2013.01); *F05D 2260/12* (2013.01)

(58) Field of Classification Search
     CPC ....... F05D 2230/68; B62B 3/001; B62B 3/02; B62B 3/10; B62B 5/0026; B62B 2202/60; B62B 2206/003; F01D 25/285; B66C 1/62; F16M 1/04
     See application file for complete search history.

(56) References Cited

U.S. PATENT DOCUMENTS

2012/0224944 A1    9/2012    Boulanger et al.
2017/0166331 A1    6/2017    Kohn et al.

FOREIGN PATENT DOCUMENTS

FR         2990190 A1    11/2013
FR         3078058 A1     8/2019

\* cited by examiner

CART FOR ASSEMBLING AND TRANSPORTING AN AIRCRAFT ENGINE TO A TEST CELL

TECHNICAL FIELD

The invention is directed to the field of aircraft engines, in particular of aircraft engine handling like in production assembly line, for repair, inspection and/or testing in a test cell and of transporting an aircraft engine to and from a test cell.

BACKGROUND ART

Test cells are commonly used for testing aircraft engines. Specific test cell equipment is generally used, consisting of a bell-mouth, a cowling or test nacelle, a nozzle and plug, a boat-tail and an adapter. The adapter is designed to attach an upper portion of the test nacelle to an upper support in the test cell, so that the aircraft engine and test equipment assembly is properly fastened in the test cell.

Assembling the aircraft engine and the test equipment requires manipulating the aircraft engine relative to the test equipment, whereas such manipulations are complex, time-consuming and can cause damages to the aircraft engine and the test equipment if done without sufficient care. Nowadays, the aircraft engine is usually manipulated by means of a crane or a monorail, i.e. suspended means.

There is therefore a need for facilitating the assembly of the test equipment (sensors, blank-off, starter, harness, fuel pipe . . . ) on an aircraft engine and then the final assembly of the engine to its adapter and transport of the resulting package assembly to a test cell. The same applies to the reverse, e.g. once the tests are over, i.e. transporting the assembly out of the test cell and disassembling the aircraft engine from the test equipment.

Prior art patent document published US 2012/0224944 A1 discloses a cart for handling an aircraft engine during assembly. The cart comprises a base frame that can be lifted and towed, and a side frame with rotating carrying means of the core of an aircraft engine. This rotating carrying means is configured for receiving the core in a vertical orientation and for pivoting said core to a horizontal orientation for assembly with another module of the aircraft engine. That cart is designed for a specific operation in the assembly of an aircraft engine, i.e. is not suitable for assembling a complete aircraft engine with a test equipment.

Prior art patent document published FR 3 078 058 A1 discloses a cart for transporting an aircraft engine, in particular equipped with thrust reversal, the cart comprising essentially a base frame optionally equipped with wheels, and two side arms pivotally mounted on the base frame with upper ends for engaging with two upper anchoring points of the aircraft engine, located under the outer casing of the nacelle of said engine. The cart can also comprise a lower transversal support beam arranged on the base frame, with two lateral ends for engaging with two lower anchoring points of the aircraft engine. The purpose and advantage of that cart is to be compact, in particular in width, essentially for facilitating the transport of the aircraft engine. It is not suitable for assembling an aircraft engine to a test equipment and for transporting such an assembly to a test cell.

Therefore, there is a need for facilitating and improving assembling an aircraft engine to a test equipment and transporting such an assembly to a test cell.

SUMMARY OF INVENTION

The invention is directed to [1] a cart for transporting an aircraft engine, comprising a base frame equipped with wheels for riding on a floor; at least two engine arms extending horizontally and movable vertically relative to the base frame, structured and designed for supporting the aircraft engine; and at least two adapter arms extending horizontally at a higher level than the at least two engine arms, structured and designed for supporting an adapter coupled at the top of the aircraft engine.

The adapter is a test equipment adapter, i.e. to secure the aircraft engine to the test cell thrust stand including the test nacelle or cowling.

According to a preferred embodiment [2] of [1], the at least two engine arms are arranged on two opposed sides of the base frame.

According to a preferred embodiment [3] of any one of [1] and [2], the at least two support arms are arranged on two opposed sides of the base frame.

According to a preferred embodiment [4] of any one of [1] to [3], the at least two support arms are arranged on the two opposed sides of the base frame where the at least two engine arms are arranged.

According to a preferred embodiment [5] of any one of [1] to [4], each of the at least two engine arms and of the at least two adapter arms comprises a free end with a recessed upper profile structured and designed for securely engaging with the aircraft engine and the adapter, respectively.

According to a preferred embodiment [6] of any one of [1] to [5], each of the at least two engine arms and adapter arms extends towards a central longitudinal axis of the cart.

According to a preferred embodiment [7] of any one of [1] to [6], the cart further comprises at least two posts extending rigidly from the base frame and carrying the at least two engine arms and the at least two adapter arms.

According to a preferred embodiment [8] of any one of [1] to [7], the at least two posts comprise at least four of said posts.

According to a preferred embodiment [9] of any one of [1] to [8], the at least two posts comprise a guiding and driving assembly for each of the at least two engine arms.

According to a preferred embodiment [10] of any one of [1] to [9], the at least two engine arms comprise two front engine arms in vis-à-vis and extending transversally to a central longitudinal axis of the cart; and at least one rear engine arm structured and designed for pivoting horizontally between an active position extending transversally to the central longitudinal axis of the cart and an inactive position extending parallel to said central longitudinal axis.

According to a preferred embodiment [11] of any one of [1] to [10], the at least two adapter arms are movable between an active position extending towards a central longitudinal axis of the cart and an inactive position freeing or widening, compared with the active position, a central area of access from above.

According to a preferred embodiment [12] of any one of [1] to [11], the wheels are mounted on the base frame such that said base frame can be selectively lifted or lowered relative to said wheels.

According to a preferred embodiment [13] of any one of [1] to [12], each of the wheels is steerable.

According to a preferred embodiment [14] of any one of [1] to [13], at least one, preferably two of the wheels are driven.

The invention is also directed to [15] a method of transporting an aircraft engine to a test cell, comprising the following steps: assembling the aircraft engine to a test nacelle attached to an adapter resting on a support; and transporting the aircraft engine and test nacelle assembly to the test cell; wherein the assembling and transporting steps are carried out using a cart comprising a base frame equipped with wheels for riding on a floor; at least two engine arms; and at least two adapter arms; wherein the assembling step comprises the following sub-steps: positioning and fixing the aircraft engine relative to the test nacelle (or cowling)while said aircraft engine is carried by the at least two engine arms; lifting the at least two adapter arms so as to engage the adapter and carry the aircraft engine and test nacelle assembly.

According to a preferred embodiment [16] of [15], the positioning and fixing sub-step comprises the following actions: carrying a front portion of the aircraft engine with two front engine arms of the at least two engine arms and carrying a rear portion of said aircraft engine with a central post bearing on the base frame, while said rear portion is inserted into the test nacelle showing an opened lower portion; deploying at least one rear engine arm of the at least two engine arms so as to carry the rear portion of the aircraft engine; mating the aircraft engine relative to the test nacelle by moving the engine arms relative to the base frame; and fixing the aircraft engine to the test nacelle.

According to a preferred embodiment [17] of one of [15] and [16], the positioning and fixing sub-step further comprises, between deploying and mating actions: removing the central post.

According to a preferred embodiment [18] of any one of [15] to [17], the lifting sub-step comprises lifting the base frame relative to the floor.

According to a preferred embodiment [19] of any one of [15] to [18], the assembling step comprises the following additional sub-step, between the positioning and fixing sub-step and the lifting sub-step: releasing the at least two engine arms.

According to a preferred embodiment [20] of any one of [15] to [19], the cart is self-driven and steered during the assembling and transporting steps. The operators have also the possibility to manually drive and reposition the cart.

According to a preferred embodiment [21] of any one of [15] to [20], the method comprises, prior the assembling step, a step of rigging the aircraft engine on the cart.

The invention is particularly interesting in that it provides an efficient and practical means for assembling an aircraft engine with a test nacelle and also for transporting that assembly to a test cell, and vice versa.

DESCRIPTION OF AN EMBODIMENT

Various embodiments will now be described in detail with reference to the drawings, which are provided as illustrative examples of the disclosure so as to enable those skilled in the art to practice the disclosure. Notably, the figures and the examples below are not meant to limit the scope of the present disclosure. Where certain elements of the present disclosure may be partially or fully implemented using known components (or methods or processes), only those portions of such known components (or methods or processes) that are necessary for an understanding of the present disclosure will be described, and the detailed descriptions of other portions of such known components (or methods or processes) will be omitted so as not to obscure the disclosure. Further, various embodiments encompass present and future known equivalents to the components referred to herein by way of illustration.

Figure 1:
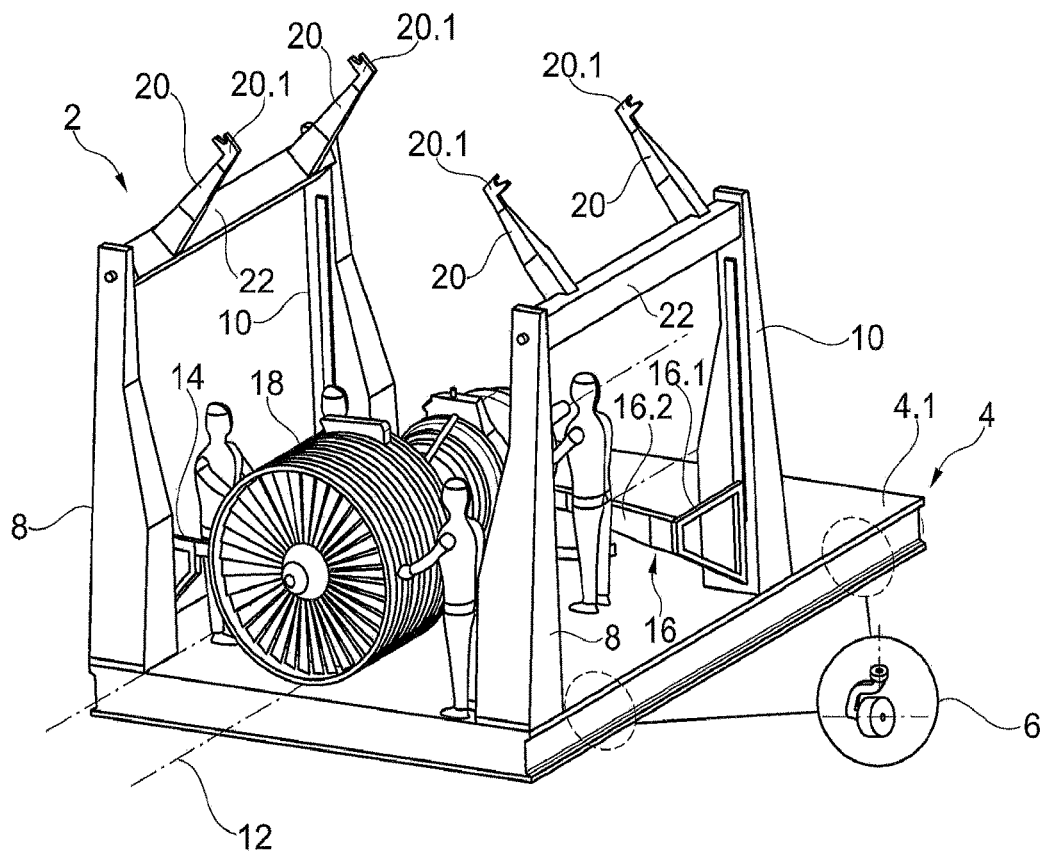
FIG. 1 is a perspective view of a cart for transporting an aircraft engine, according to the invention.

FIG. 1 is a perspective view of a cart for transporting an aircraft engine, according to the invention.

The cart 2 comprises a base frame 4 that is advantageously generally planar though showing a certain depth, e.g. at least 200 mm, equipped with wheels 6 that are for instance hidden in the base frame. The wheels 6 are advantageously each steerable and driven in rotation, e.g. by an electric motor. The wheels 6 are advantageously structured and designed for allowing the cart to turn on its self, i.e. with a turning radius close or equal to 0.

The cart 2 comprises also posts 8 and 10 extending vertically from the base frame 4. The posts can comprise two front posts 8 and two rear posts 10. Each of them is located adjacent an edge of the base frame 4. The two front posts 8 and the two rear posts 10 are located on either sides of a longitudinal axis 12 of the cart 2.

The cart 2 comprises also engine arms 14 and 16 structured and designed for carrying the aircraft engine 18. These engine arms 14 and 16 extend horizontally and are movable vertically. They are supported by the posts 8 and 10. The engine arms comprise for instance two front engine arms 14 carried each by one of the front posts 8. The right front engine arm 14 is not visible in FIG. 1. The engine arms comprise also one rear engine arm 16 carried by one of the rear posts 10, in the present case the right rear post 10. Each post 8 and 10 supporting an engine arm 14 or 16 comprises a guiding rail and mechanism for vertically moving the engine arm along the rail. That mechanism can be a thread spindle arranged vertically and engaging with a nut fastened to the corresponding engine arm. Other mechanisms, like a hydraulic cylinder (and not limited to), can be considered. The two front engine arms 14 are generally straight and extend perpendicularly to the longitudinal axis 12 of the cart 2 whereas the rear engine arm 16 comprises a first portion 16.1 directly supported by the rear post 10 and extending parallel to the longitudinal axis 12, and a second portion 16.2 pivotally connected to the first portion 16.1, movable between a position where it is essentially in line with the first portion 16.1 and a position where it extends transversally, for instance perpendicularly to the longitudinal axis 12.

The front and/or rear engine arms 14 and 16 can comprise, each, a distal portion that is removably attached to a main portion of said arm, so as be modular. Each distal removable portion would then be adapted to a particular aircraft engine model or type with a given geometry. The attachment of the distal removable portion to the main portion of the corresponding engine arm can be by self-locking engagement, making use or not of fasteners.

The engine arms 14 and 16 can be engaged with the corresponding front and rear posts 8 and 10 in a removable manner so as to be easily replaced by others adapted to another type of engine.

The cart 2 comprises also adapter arms 20 located at higher position than the engine arms 14 and 16 and configured for engaging with an adapter of a test equipment, as this will be detailed below in connection with FIG. 6. The adapter arms 20 comprise in the present embodiment four adapter arms 20, i.e. two adapter arms 20 on each side of the longitudinal axis 12 of the cart 2. The adapter arms 20 are designed for working in unison, i.e. do not need to be movable relative to each other. In the present embodiment, each pair of adapter arms 20, on each side of the longitudinal axis 12 of the cart 2, is rigidly fastened to a common longitudinal beam 22 supported by the corresponding front post 8 and rear post 10. The longitudinal beam 22 is advantageously pivotally mounted on the front post 8 and rear post 10, about a longitudinal axis. This pivoting movement is for moving the adapter arms 20 from an active position where they extend essentially horizontally to an inactive position where they free or widen, compared with the active position, a central area of access from above, as illustrated in FIG. 1, and vice versa.

In the present embodiment, the adapter arms remain fixed in the active position, e.g. by means of appropriate arresting and/or abutting means (not visible or not represented) in the pivoting connection between the longitudinal beams 22 and the corresponding front and rear posts 8 and 10. In that case, the wheels 6 are mounted on the base frame 4 such that said base frame can be selectively lifted or lowered relative to said wheels 6, so as to selectively lift or lower the adapter arms 20. Alternatively or complementary to such wheels, the base frame can comprise integrated jacks configured for being lowered so as to contact the ground and raise said base frame 4 upwardly, similarly to outriggers and stabilizers on mobile cranes.

Alternatively, the adapter arms 20 can be movable vertically, similarly to the engine arms 14 and 16, in which case the base frame 4 does not need to be vertically movable relative to the wheels 6 or the ground.

As this is apparent in FIG. 1, the adapter arms 20 comprise each a free end 20.1 with a recessed upper profile structured and designed for securely engaging with the adapter. The same applies to the engine arms whereas this is not visible in FIG. 1 but well in FIG. 7 (see 14.1).

The base frame 4 advantageously comprises a generally planar floor 4.1 particularly adequate for enabling and facilitating personnel to work on and around the aircraft engine 18 while supported by the engine arms 14 and 16 as illustrated in FIG. 1.

The cart 2 can comprise a control unit of the wheels 6 structured and designed for enabling the cart to move as a self-driven vehicle. It can also comprise guiding means along a track on the floor, e.g. optical and/or magnetic detecting means, laser scanning (but not limited to), for enabling the cart to move in an autonomous way along the track, similarly to carts carrying parts or workpieces in a production factory, from one workstation to a next one in a safe way (personnel and equipment protection).

The cart 2 illustrated in FIG. 1 will be further detailed in connection with FIGS. 2 to 7.

FIGS. 1 to 7 illustrate also successive phases of a method of transporting an aircraft engine to a test cell, according to the invention.

In FIG. 1, the aircraft engine 18 is placed on the engine arms 14 and 16 by an external means like a crane. To that end, the adapter arms 20 are advantageously brought in their inactive position freeing or widening, compared with the active position, a central area of access from above, as illustrated in FIG. 1. More specifically, in FIG. 1, the aircraft engine 18 is carried at its front portion by the two front engine arms 14 and at its rear portion by the (right) rear engine arm 16. In that position, at arms' height, the engine can be comfortably further assembled and/or prepared for the test.

Figure 2:
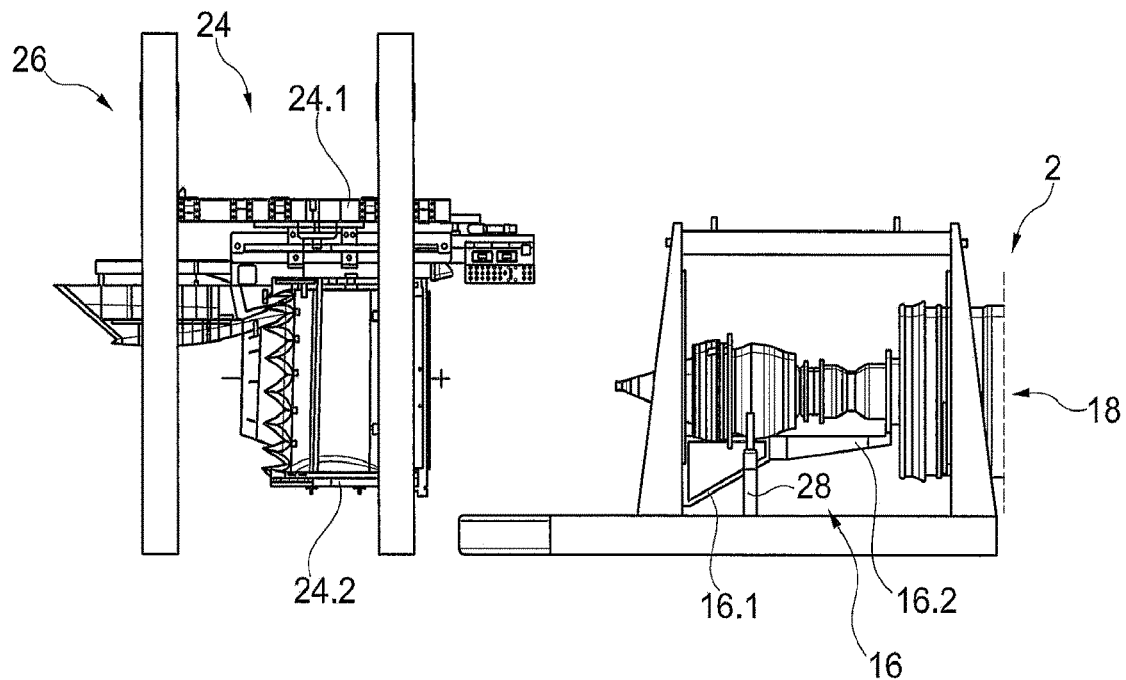
FIG. 2 is a side view of an approaching phase of a step of assembling an aircraft engine to a test nacelle, using the cart of the invention.

In FIG. 2, the cart 2 with the aircraft engine 18 is moved towards a test equipment 24 placed on a support 26. The test equipment 24 comprises for instance an adapter 24.1 and a test nacelle 24.2 attached at its upper portion to the adapter 24.1. Such a test equipment 24 is as such known from the skilled person and does not need to be specifically further detailed. As this is apparent in FIG. 2, the rear portion of the aircraft engine 18 is oriented towards the main opening of the test nacelle 24.2 in order to penetrate it.

Also, a central post 28 is placed below the rear portion of the aircraft engine 18 so as to carry said rear portion. The rear engine arm 16 is disengaged from the engine rear portion and pivoted to the inactive position where it extends completely longitudinally, i.e. where the second portion 16.2 is aligned with the first portion 16.1.

Figure 3:
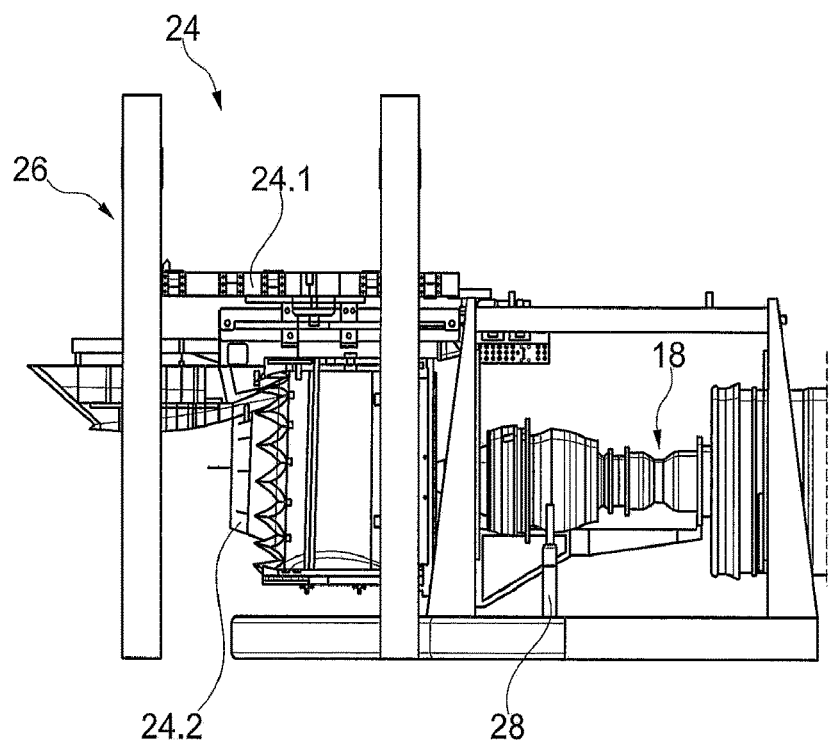
FIG. 3 is a side view of an engaging phase of the step of assembling an aircraft engine to a test nacelle, using the cart of the invention.
Figure 4:
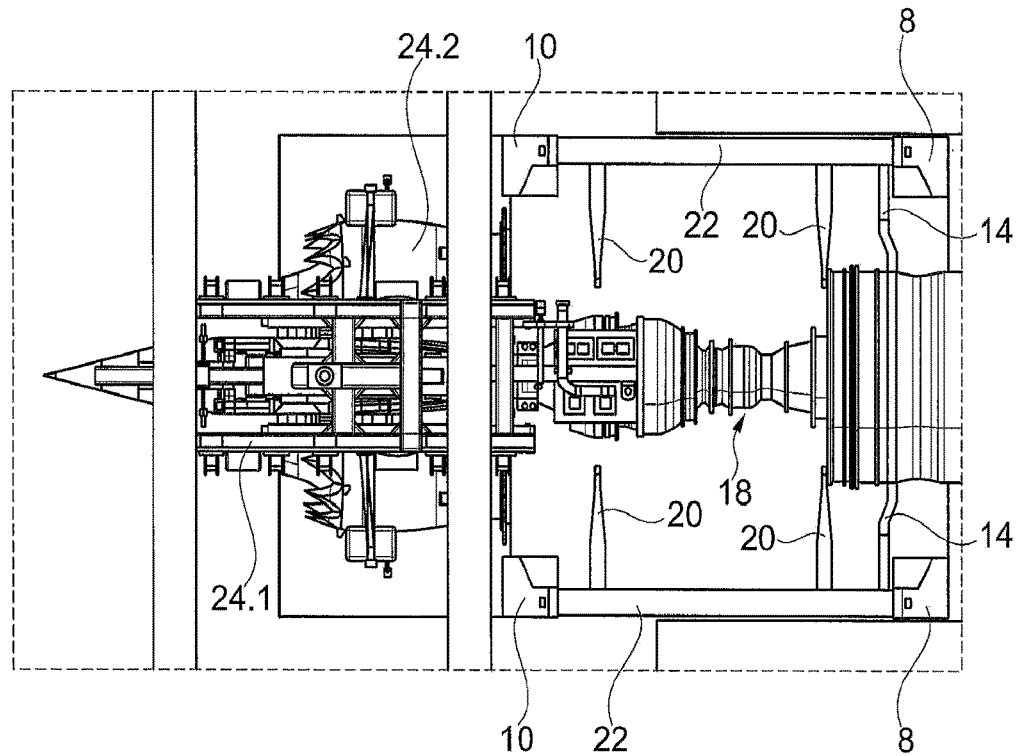
FIG. 4 is a top view of the engaging phase of the step of assembling an aircraft engine to a test nacelle of FIG. 3.

In FIGS. 3 and 4, the cart 2 with the aircraft engine 18 is further moved towards the test equipment 24, where the rear portion of the aircraft engine 18 starts to penetrate the test nacelle 24.2. The rear engine arm 16 does not interfere with the test nacelle 24.2 for it is brought to the inactive position extending between the corresponding front post 8 and rear post 10.

As this is apparent in FIG. 4, the rear posts 10 are sufficiently laterally distant from each other so as to pass outside of the test nacelle 24.2.

As this is also apparent in FIG. 4, the adapter arms 20 are brought in their active position in order to pass below the adapter 24.1 when the cast 2 is further moved towards the test equipment 24.

Important is to note that the test nacelle is essentially made of two half-shells hinged together at an upper portion adjacent to the adapter 24.1 and separated from each other at a lower portion (see FIG. 6), enabling the central post 28 to pass freely through that free lower space.

Figure 5:
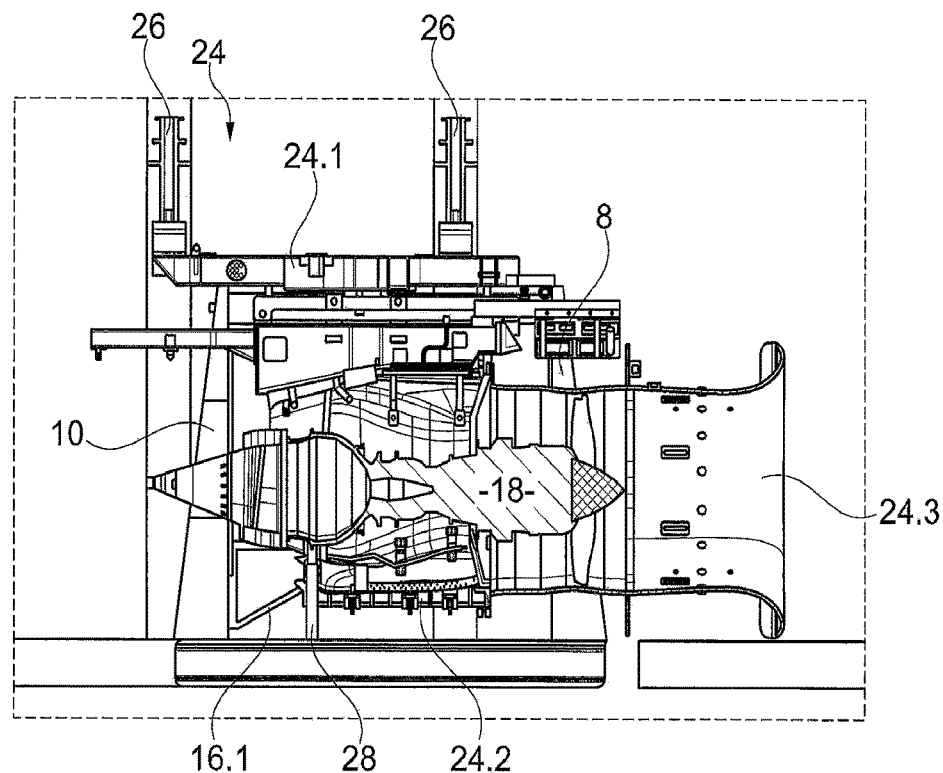
FIG. 5 is a side view of the end of the engaging phase of the step of assembling an aircraft engine to a test nacelle.

In FIG. 5, the aircraft engine 18 has reached its final position relative to the test nacelle 24.2. In that position, the rear engine arm 16 can be brought back to its active position, i.e. by bringing the second portion thereof (not visible in FIG. 5) in a transversal position extending towards the rear portion of the aircraft engine 18 so as to engage again with said engine. The rear engine arm 16, once engaged back with the aircraft engine 18 can be slightly lifted so as to release the central post 28 which can then be removed. The aircraft engine 18 is then carried by the two front engine arms 14 and the rear engine arm 16. Its position relative to the test nacelle 24.2 can be finely adjusted by adjusting the height of the engine arms 14 and 16. Once the position of the aircraft engine 18 is mated with the test nacelle 24.2, said engine is rigidly fastened to the test nacelle 24.2.

The engine arms 14 and 16 can then be lowered so as to be disengaged from the aircraft engine 18 while the latter and the test nacelle 24.2 are held in position by the adapter 24.1 placed on the support 26.

As this is visible in FIG. 5, the test equipment 24 can comprise a bell-mouth 24.3 simulating the inlet of the real nacelle of the aircraft. That bell-mouth 24.3 can be mounted on the front portion of the aircraft engine 18 once the aircraft engine 18 has reached its final position relative to the test nacelle 24.2.

Figure 6:
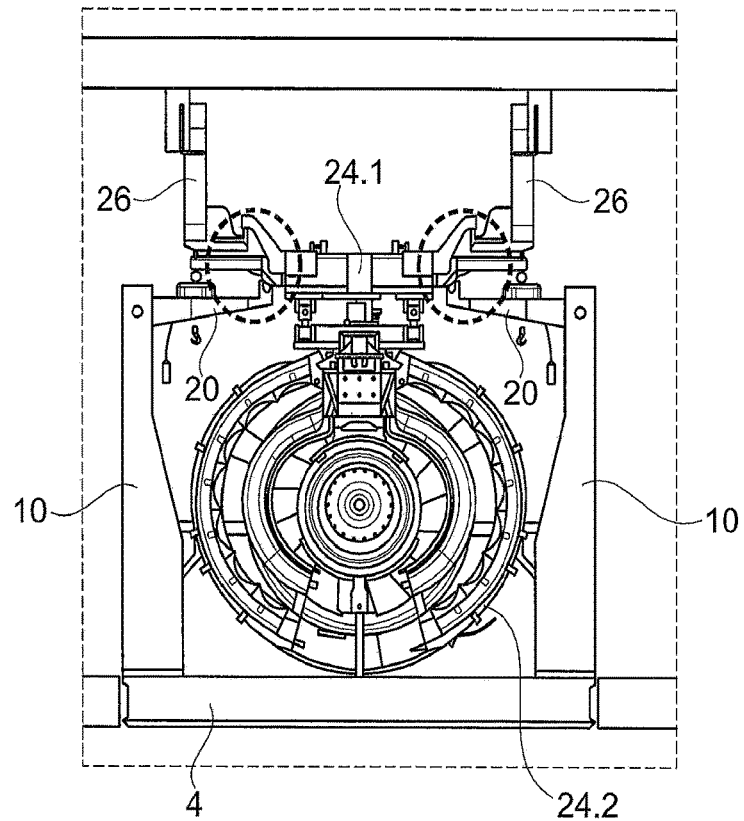
FIG. 6 is a rear view of the lifting phase of the step of assembling an aircraft engine to a test nacelle.

In FIG. 6, the adapter arms 20 are lifted to as to engage with the adapter 24.1 and lift said adapter from the support 26. To that end and with reference to the above discussion relative to FIG. 1 and the wheels of the cart 2, that movement can be achieved by lifting the base frame 4 relative to the wheels (not visible) while the adapter arms 20 remain in a fixed position relative to the base frame 4. Still with reference with the above discussion, this can also be achieved by a relative movement of the adapter arms 20. Once the adapter 24.1 is lifted from the support 26, e.g. by a few millimeters or centimeters, the cart 2 can move away from the support 26 either by a reverse movement or a forward movement. The aircraft engine and test nacelle assembly 18+24.2 is then supported exclusively by the adapter arms 20 via the adapter 24.1.

Figure 7:
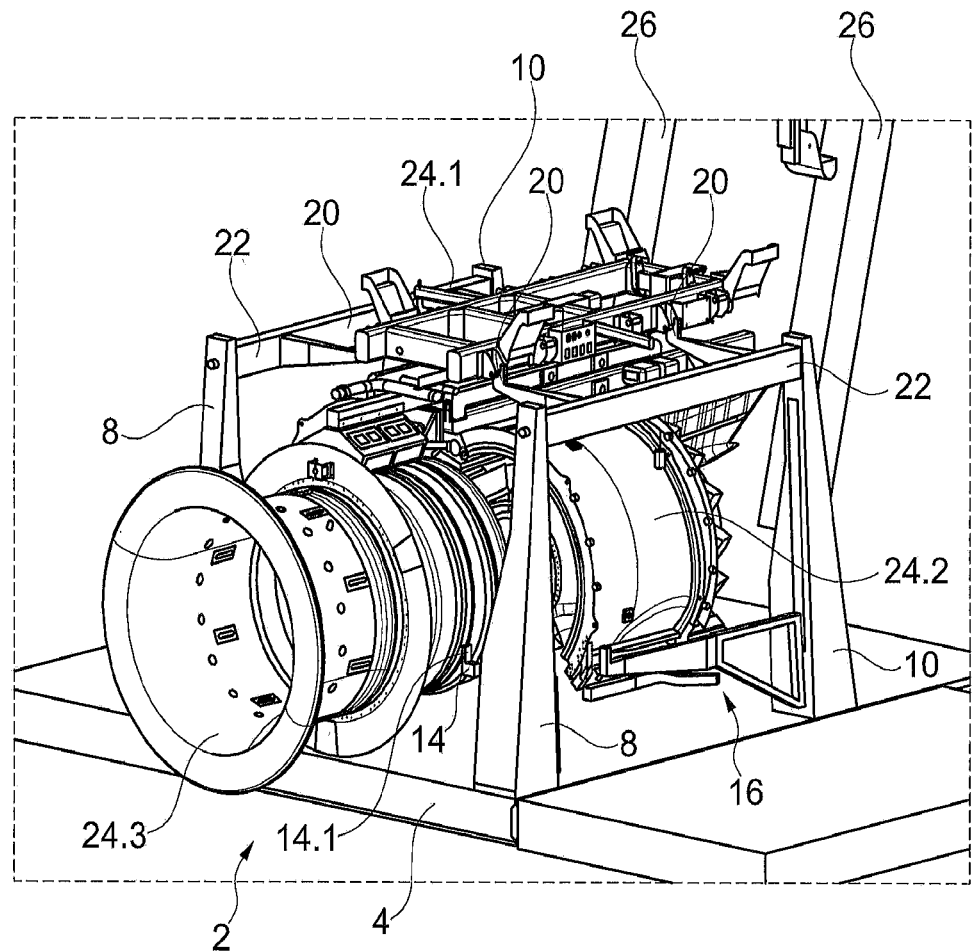
FIG. 7 is a perspective view of a transporting step to a test cell of the aircraft engine and test nacelle assembly using the cart of the invention.

FIG. 7 shows the cart 2 carrying the aircraft engine and test nacelle assembly 18+24.2 after disengagement of the support 26 as mentioned in relation with FIG. 6. The cart 2 can then transport the aircraft engine and test nacelle assembly 18+24.2 to a test cell.

It goes without saying that the above phases can take place in the reverse order once the test is finished.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense.

The invention claimed is:

1. Cart for transporting an aircraft engine, comprising:
a base frame equipped with wheels for riding on a floor;
at least two engine arms extending horizontally and movable vertically relative to the base frame, structured and designed for supporting the aircraft engine; and
at least two adapter arms extending horizontally at a higher level than the at least two engine arms, structured and designed for supporting an adapter coupled to a test nacelle, at the top of the aircraft engine, wherein the at least two adapter arms are further structured and designed to lift the adapter with respect to the base frame.

2. Cart according to claim 1, wherein the at least two engine arms are arranged on two opposed sides of the base frame.

3. Cart according to claim 1, wherein the at least two adapter arms are arranged on two opposed sides of the base frame.

4. Cart according to claim 3, wherein the at least two adapter arms are arranged on the two opposed sides of the base frame where the at least two engine arms are arranged.

5. Cart according to claim 1, wherein each of the at least two engine arms and of the at least two adapter arms comprise a free end with a recessed upper profile structured and designed for securely engaging with the aircraft engine and the adapter, respectively.

6. Cart according to claim 1, wherein each of the at least two engine arms and adapter arms extends towards a central longitudinal axis of the cart.

7. Cart according to claim 1, further comprising:
at least two posts extending rigidly from the base frame and carrying the at least two engine arms and the at least two adapter arms.

8. Cart according to claim 7, wherein the at least two posts comprise at least four of said posts.

9. Cart according to claim 7, wherein the at least two posts comprise a guiding and driving assembly for each of the at least two engine arms.

10. Cart according to claim 1, wherein the at least two engine arms comprise:
two front engine arms in vis-à-vis and extending transversally to a central longitudinal axis of the cart; and
at least one rear engine arm structured and designed for pivoting horizontally between an active position extending transversally to the central longitudinal axis of the cart and an inactive position extending parallel to said central longitudinal axis.

11. Cart according to claim 1, wherein the at least two adapter arms are movable between an active position extending towards a central longitudinal axis of the cart and an inactive position freeing or widening, compared with the active position, a central area of access from above.

12. Cart according to claim 1, wherein the wheels are mounted on the base frame such that said base frame can be selectively lifted or lowered relative to said wheels.

13. Cart according to claim 1, wherein each of the wheels is steerable.

14. Cart according to claim 1, wherein at least two of the wheels are driven.

15. Method of transporting an aircraft engine to a test cell, comprising the following steps:
assembling the aircraft engine to a test nacelle attached to an adapter resting on a support; and
transporting the aircraft engine and test nacelle assembly to the test cell;
wherein the assembling and transporting steps are carried out using a cart comprising:
a base frame equipped with wheels for riding on a floor;
at least two engine arms; and
at least two adapter arms;
wherein the assembling step comprises the following sub-steps:
positioning and fixing the aircraft engine relative to the test nacelle while said aircraft engine is carried by the at least two engine arms;
lifting the at least two adapter arms so as to engage the adapter and carry the aircraft engine and test nacelle assembly.

16. Method according to claim 15, wherein the positioning and fixing sub-step comprises the following actions:
carrying a front portion of the aircraft engine with two front engine arms of the at least two engine arms and carrying a rear portion of said aircraft engine with a central post bearing on the base frame, while said rear portion is inserted into the test nacelle showing an opened lower portion;
deploying at least one rear engine arm of the at least two engine arms so as to carry the rear portion of the aircraft engine;
mating the aircraft engine relative to the test nacelle by moving the engine arms relative to the base frame; and
fixing the aircraft engine to the test nacelle.

17. Method according to claim 16, wherein the positioning and fixing sub-step further comprises, between deploying and mating actions:
removing the central post.

18. Method according to claim 15, wherein the lifting sub-step comprises lifting the base frame relative to the floor.

19. Method according to claim 15, wherein the assembling step comprises the following additional sub-step, between the positioning and fixing sub-step and the lifting sub-step:

releasing the at least two engine arms.

20. Method according to claim 15, wherein the cart is self-driven and steered during the assembling and transporting steps.

\* \* \* \* \*

UNITED STATES PATENT AND TRADEMARK OFFICE
CERTIFICATE OF CORRECTION

PATENT NO. : 12,459,669 B2  
APPLICATION NO. : 18/022226  
DATED : November 4, 2025  
INVENTOR(S) : Franck Dumont Page 1 of 1

It is certified that error appears in the above-identified patent and that said Letters Patent is hereby corrected as shown below:

On the Title Page

Item (71), should read: Safran Aero Boosters.

Signed and Sealed this  
Tenth Day of February, 2026

John A. Squires  
*Director of the United States Patent and Trademark Office*